United States Patent
Riddiford et al.

(10) Patent No.: US 6,390,565 B2
(45) Date of Patent: May 21, 2002

(54) BRAKE BY WIRE SYSTEM WITH SEPARATE CONTROLLERS AND BOTH POSITION AND FORCE INPUT SENSORS

(75) Inventors: Bryan Peter Riddiford, Dayton; John Benjamin Hageman; Donald Edward Schenk, both of Vandalia; Schuyler Scott Shaw, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/791,381

(22) Filed: Feb. 23, 2001

Related U.S. Application Data
(60) Provisional application No. 60/184,586, filed on Feb. 24, 2000.

(51) Int. Cl.[7] .............................. B60T 13/74
(52) U.S. Cl. ........................ 303/3; 303/20; 303/113.4
(58) Field of Search .................. 303/3, 15, 20, 303/113.4, 115.2, 191, 155

(56) References Cited

U.S. PATENT DOCUMENTS

| | | | |
|---|---|---|---|
| 5,230,549 A | * | 7/1993 | Osada et al. .................. 303/3 |
| 5,362,135 A | | 11/1994 | Riddiford et al. |
| 5,567,021 A | * | 10/1996 | Gaillard ......................... 303/3 |
| 6,099,086 A | * | 8/2000 | Feigel et al. ............. 303/113.4 |

* cited by examiner

Primary Examiner—Pam Rodriguez
(74) Attorney, Agent, or Firm—Robert M. Sigler

(57) ABSTRACT

A brake by wire system provides the capability of both travel and force sensors on a brake apply input member such as a brake pedal and also provides redundancy in sensors by providing the signal from a sensor responsive to travel or position of the brake pedal to a first controller and the signal from a sensor responsive to force applied to the brake pedal to a second controller. The first and second controllers are connected by a bi-directional communication link whereby each controller may communicate its received one of the sensor signals to the other controller. In at least one of the controllers, linearized versions of the signals are combined for the generation of first and second brake apply command signals for communication to brake apply units. If either controller does not receive one of the sensor signals from the other, it nevertheless generates its brake apply command signal on the basis of the sensor signal provided directly to it from the sensor. In a preferred embodiment of the system, a controller combines the linearized signals by choosing the largest in magnitude.

5 Claims, 2 Drawing Sheets

BRAKE BY WIRE SYSTEM WITH SEPARATE CONTROLLERS AND BOTH POSITION AND FORCE INPUT SENSORS

RELATED PATENT APPLICATIONS

This application references Provisional U.S. Patent Application No. 60/184,586, filed Feb. 24, 2000 and entitled Dry Interface Corner Brake by Wire System Architecture.

TECHNICAL FIELD

The technical field of this invention is vehicle brake by wire systems.

BACKGROUND OF THE INVENTION

A brake by wire system separates the input and control apparatus of the braking system from the actuators by one or more electrical communication lines. Thus there is no direct transmission of force from the vehicle operator to the brake actuators. Such systems are therefore designed with care to provide built in dependability of the components; and one method of providing such dependability is redundancy. But redundancy also increases cost, and it is thus desirable to achieve the redundancy while minimizing this extra cost.

An important element of any braking system, including one according to this invention, is that providing driver input for brake apply, typically the brake pedal. In a hydraulic brake system, this may be a typical mechanical device against which a driver may push a force to apply the brakes through the hydraulic system, with possible power assist. But in a brake by wire system, the brake pedal must be provided with a sensor to detect some aspect of pedal movement and generate an electric signal for the controller that indicates driver intent. Typical sensors used for this task are travel or position sensors and applied force sensors. Each has its own characteristics that may enhance a brake by wire system.

SUMMARY OF THE INVENTION

The braking system of this invention provides the capability of both travel and force sensors on a brake apply input member such as a brake pedal and also provides redundancy in sensors by providing the signal from a sensor responsive to travel or position of the brake apply input member to a first controller and the signal from a sensor responsive to force applied to a brake apply input member to a second controller. The first and second controllers are connected by a bi-directional communication link whereby each controller may communicate its received one of the sensor signals to the other controller. In at least one of the controllers, linearized versions of the signals are combined for the generation of first and second brake apply command signals for communication to brake apply units. If either controller does not receive one of the sensor signals from the other, it nevertheless generates its brake apply command signal on the basis of the sensor signal provided directly to it. In a preferred embodiment of the system, a controller combines the linearized signals by choosing the largest in magnitude.

DESCRIPTION OF THE PREFERRED EMBODIMENT

Figure 1:
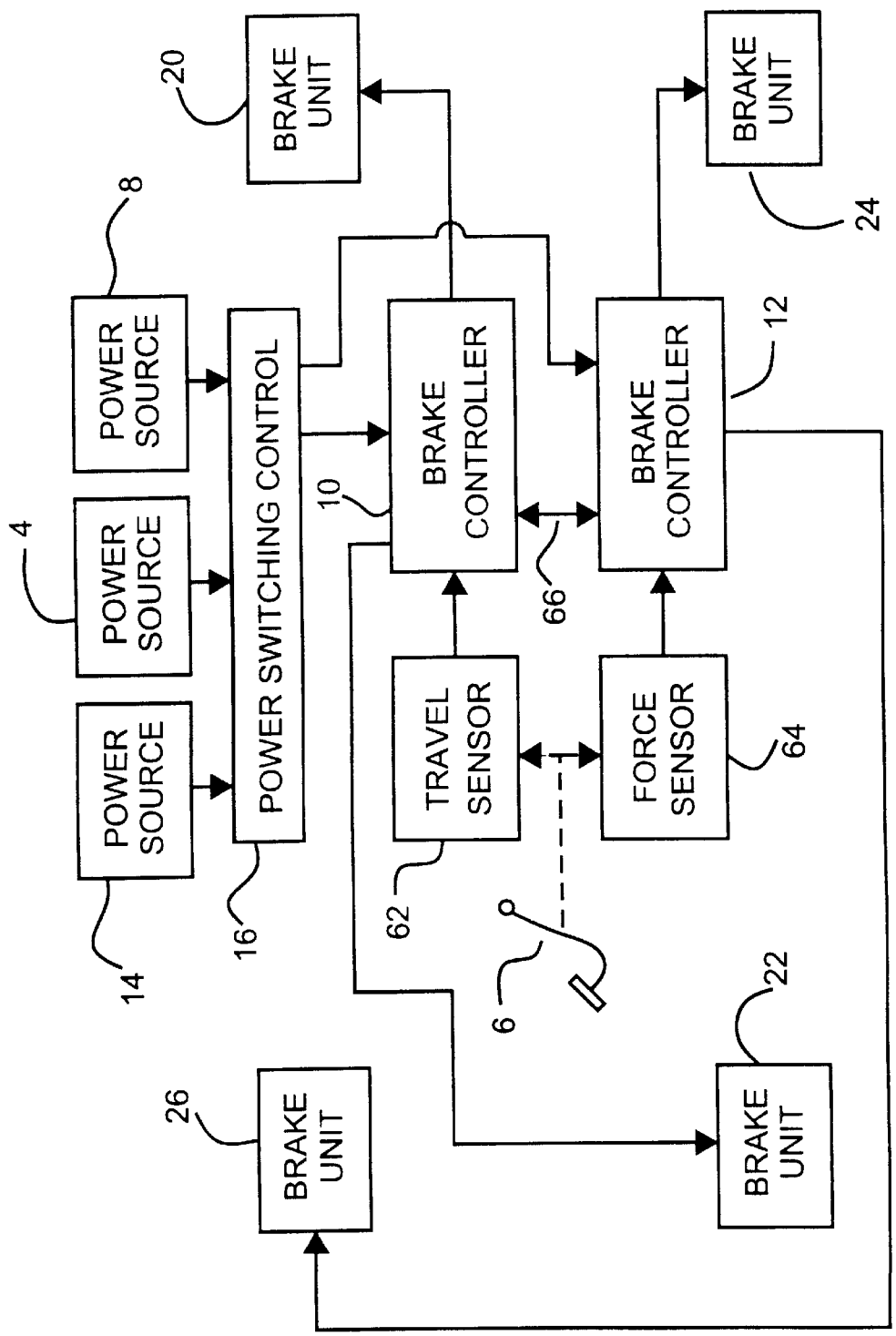
FIG. 1 is a block diagram of a brake by wire system for a motor vehicle according to the invention.

Referring to FIG. 1, a brake-by-wire system comprises an electronic brake controller 10 that controls at least one vehicle wheel brake unit in response to an input signal from an operator input device such as a brake pedal 6. Preferably, it controls brake units on two wheels of a four wheel vehicle; and in this embodiment the brake control is diagonal, with controller 10 controlling left front brake 20 and right rear brake 22. A second electronic brake controller 12 controls at least one other vehicle wheel brake units and preferably the brake units on the other two brakes of the four wheel vehicle: in this embodiment right front brake 24 and left rear brake 26. The system is provided with electric power from at least one or more electric power sources, in this embodiment electric power sources 14, 4, and 8, which may comprise at least one electric generator such as an engine driven alternator or a fuel cell and at least one electric power storage device such as a battery. Either of controllers 10 and 12 may be powered from any of power sources 14, 4 or 8 or any combination thereof. A suitable electric power architecture is shown in PCT application 01/05941, filed in the U.S. Patent and Trademark Office on Feb. 23, 2001 and entitled Brake by Wire Electrical System Architecture with Multiple Power Sources and Circuit Protection. But the number or arrangement of such electric power sources, and the manner in which the power is provided are not critical to this invention; and any suitable power scheme may be used.

The brake system is provided operator input from brake pedal 6 by means of at least two sensors responsive to operator brake activation parameters input through brake pedal 6; and each of these sensors provides its output signal to a different one of controllers 10 and 12. In this embodiment, controller 10 is provided with a brake activation signal from a brake apply input (pedal) travel or position sensor 62; and control module 12 is provided with a brake activation signal from a brake apply input (pedal) force sensor 64.

Each of controllers 10 and 12 preferably contains a digital computer that runs a stored computer program outputting a brake command signal to its respective controlled brakes. Controllers 10 and 12 are connected by a communication link 66, preferably a digital communication link; and the modules exchange information between themselves for the coordination of the command signals produces. Typically, although not exclusively, one of controllers 10 and 12 would be designated a lead controller and the other designated a supplemental controller. In such an arrangement, assuming controller 10 is the lead controller, the core brake control routine would be located in controller 10 and would receive the signal from sensor 62 directly and from sensor 64 over the communication link 66 in computing basic brake unit commands for all brake units 20–26, with the basic brake unit commands for brake units 24 and 26 communicated to controller 12. Each controller would then adapt the basic brake unit commands for the intended brake units as required and output the adapted commands to the respective brake units.

The signals from sensors 62 and 64, which provide somewhat different, though related, information concerning driver brake apply input, would be combined in some manner that could be as simple as choosing one or the other or mathematically combining the values according to some more complex algorithm utilizing the unique qualities of the travel and force sensor signals. But, in the case of failure of one of the sensors 62 or 64, failure of the communication link 66 or failure of one of the controllers 10 and 12, the other controller would use the available one of the signals from sensors 62 and 64 to provide brake unit operation according to either brake pedal travel or brake pedal applied force to perform vehicle stopping functions. If one of controllers 10 and 12 or the communication link has failed, the brake operation would need to be performed with only the two brake units controlled by the still functioning brake controller. If one of the sensors 62 and 64 is the only failure, then all brakes could be controlled on the basis of the working one of sensors 62 and 64, and the software could be pre-programmed to adapt the braking control algorithm to the nature of the sensor signal: travel or force. An alternative approach to the control architecture is to provide each of controllers 10 and 12 with full brake control systems with coordination but with the capability of either controller operating the entire brake system with whatever signals are available.

Figure 2:
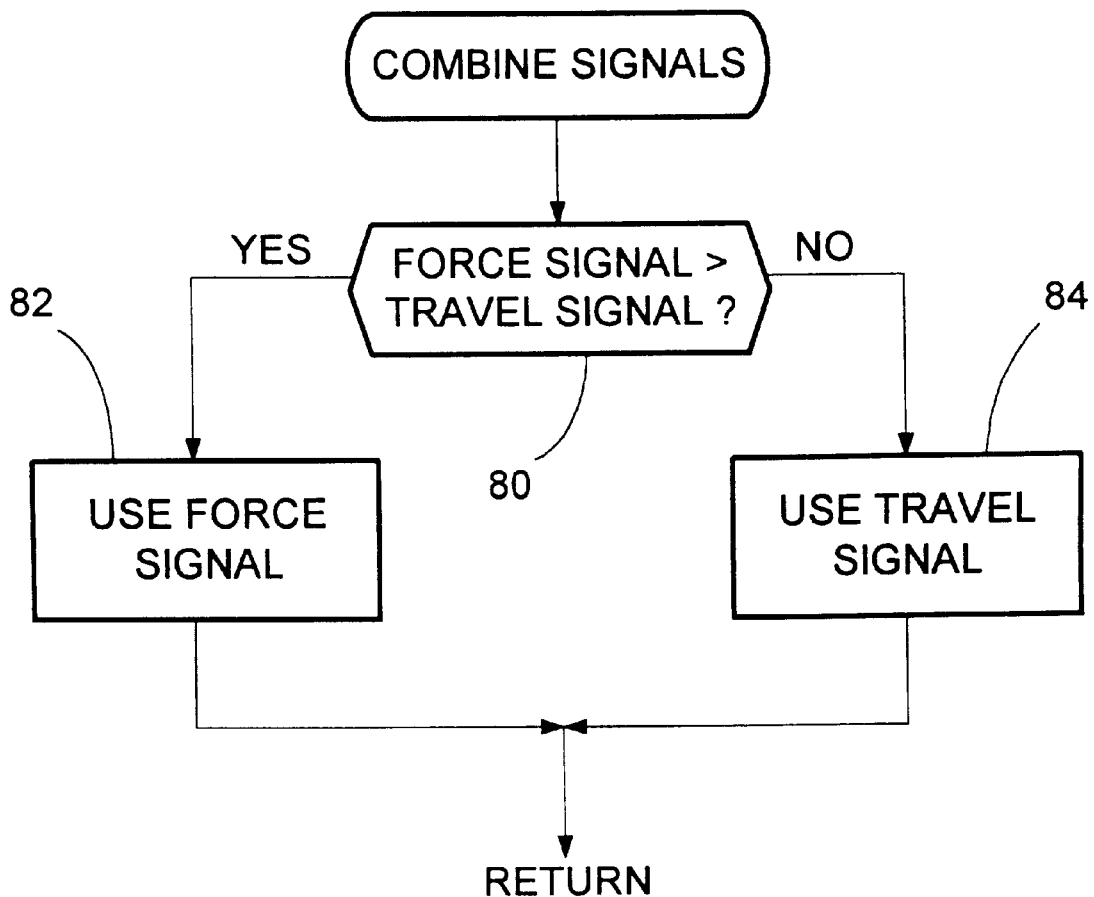
FIG. 2 is a flow chart illustrating an aspect of the operation of the system of FIG. 1.

FIG. 2 is a flow chart showing a simple example of a subroutine for combining the signals from travel sensor 62 and force sensor 64. Beginning at step 80, the two signals, compensated in a predetermined manner for comparison of unlike quantities, are compared in magnitude. The compensation preferably takes the form of linearizing the outputs of each sensor over its full range in brake system operation. Thus, a look-up table may be provided for each sensor with calibrated linearized values derivable from the sensor data input. The larger of the two determines whether the force sensor signal from sensor 64 is chosen at step 82 or the travel sensor signal from sensor 62 is chosen at step 84. This simple example has the benefit that it will automatically adjust for the absence of one of the signals, since the absent signal will be zero and the other will be chosen.

What is claimed is:

1. A vehicle braking system comprising, in combination:
   a first brake actuator responsive to a first brake command signal to generate a first controlled braking force;
   a second brake actuator responsive to a second brake command signal to generate a second controlled braking force;
   a brake apply input member;
   a first sensor responsive to position of the brake apply input member to generate a brake apply input position signal;
   a second sensor responsive to force exerted on the brake apply input member to generate a brake apply input force signal;
   a first controller connected to receive the brake apply input position signal from the first sensor and generate the first brake command signal;
   a second controller connected to receive the brake apply input force signal from the second sensor and generate the second brake command signal;
   a bi-directional data communication link connected between the first and second controllers for sharing data based on the brake apply input position signal and the brake apply input force signal;
   means in the first controller for generating the first brake command signal in response to the brake apply input position signal and the brake apply input force signal when the brake apply input force signal is provided by the second controller over the bi-directional communication link and alternatively in response to only the brake apply input position signal when the brake apply input force signal is not so provided; and
   means in the second controller for generating the second brake command signal in response to the brake apply input position signal and the brake apply input force signal when the brake apply input position signal is provided from the first controller over the bi-directional communication link and alternatively in response to only the brake apply input force signal when the brake apply input position signal is not so provided.

2. The vehicle braking system of claim 1 in which the means in the first controller generates the first brake command signal in response to a chosen one of the signals from the first sensor and the second sensor, the choice being made on the basis of a comparison of linearized magnitudes of the signals from the first and second sensors.

3. The vehicle braking system of claim 2 in which the greater of the linearized magnitudes of the signals from the first and second sensors is chosen.

4. The vehicle braking system of claim 1 in which the means in the second controller generates the second brake command signal in response to a chosen one of the signals from the first sensor and the second sensor, the choice being made on the basis of a comparison of linearized magnitudes of the signals from the first and second sensors.

5. The vehicle braking system of claim 4 in which the greater of the linearized magnitudes of the signals from the first and second sensors is chosen.

* * * * *